United States Patent Office 3,099,309
Patented July 30, 1963

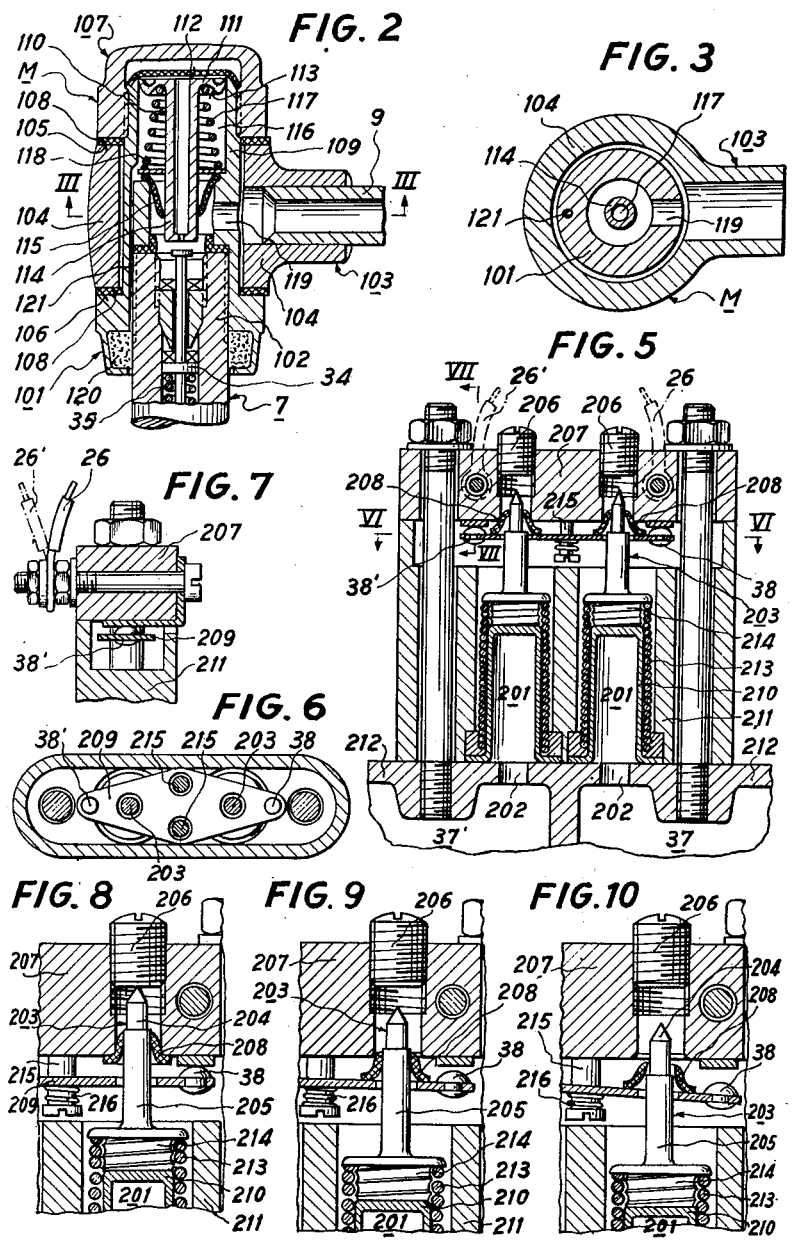

3,099,309
APPARATUS AND DEVICES FOR AUTOMATIC CONTROL AND SUPERVISION OF THE PRESSURE OF THE TIRES OF VEHICLE WHEELS
Luis Congost Horta, Iradier 6 bis, and Pedro López Garcia, Llastichs 13, both of Barcelona, Spain
Filed June 19, 1961, Ser. No. 118,018
Claims priority, application Spain June 20, 1960
7 Claims. (Cl. 152—416)

This invention relates to a system for automatic control and supervision of the pressure of the tires of vehicle wheels and to a number of devices for use in such system.

The invention is for use with any kind of vehicle adapted to run on pavements (highways, roads, airfields and landing strips) on wheels fitted with pneumatic tires having conventional valves, both in the case of fixed or orientable wheels of land vehicles including motor cycles, motor vehicles, trucks and so on and in the case of the fixed or retractable wheels of aircraft. The main advantages which the invention provides are as follows:

(1) The conventional valves are retained, thus facilitating the installation of the device according to the invention without any need to change the tires.

(2) A constant pressure is maintained automatically in each tire of the vehicle (including when the particular pressure concerned tends to rise), with a resultant improvement in tire life.

(3) Selective control of tire pressure can be obtained when it is required to vary the same because of changes in vehicle loading or the state of the running surface.

(4) A continuous indication of tire pressure is provided on the vehicle dashboard, and the vehicle can, if required, be provided with audible or visual warning signals which operate when the pressure of a tire decreases because of a puncture or of some other damage.

(5) Provided that the loss of air from a puncture does not exceed a predetermined value, the vehicle can be run on the punctured tire without any disadvantage and at a constant pressure.

(6) In the case set forth in (5) herein, the tires can help one another by being so arranged that there is intercommunication for the air of all the tires including the spare tires.

The system according to the invention comprises in combination: a single pipe for each tire to be controlled and supervised, such pipe extending up to the tire valve and, at least while the vehicle engine is in operation, being permanently maintained under pressure; compressed air supply means communicating with said single pipes and providing compressed air permanently at least while the vehicle is in operation; for each tire to be controlled and supervised, a conventional actuator of the corresponding valve, such actuator being disposed between such valve and the associated single pipe and being of a kind known per se comprising a differential member, such as a piston or diaphragm, adapted to be operated by the pressure in said single pipe to open said conventional valve and to provide a communication between such pipe and the tire; and controllable discharge means which communicates with said single pipe and which provide a continuous discharge of the excess compressed air supplied by said compressed air supply means when a critical pressure selectable by the vehicle driver is reached.

The invention also comprises an actuator of the kind specified and a supervisory device for use in the system according to the invention.

According to the invention, the actuator comprises a spring which is separate from the normal valve spring and which operates directly on the differential member to render the same inoperative when the pressure in the associated single pipe is below a desired limit.

According to the invention, valve means are provided for rapid discharge of the single pipes. According to the invention, to ensure that this rapid discharge may be produced automatically when the pressure in said single pipes drops to a desired value, a supervisory device is also provided to electrically control such pressure, the supervisory device comprising: a pressure-sensitive member connected to the corresponding single pipe and adapted to move and take up different positions in accordance with the pressure in the single pipe; a pin connected to said member and extending in the direction of movement thereof; and a thrust element resiliently fitted to said pin so as to be slidable therealong during pin advance and to be retained on a part of the pin during the return movement thereof, then acting operatively.

These and other features of the invention will become apparent from the following description, reference being made to the accompanying drawings wherein:

FIGURE 2 is a longitudinal sectional view of an actuator device disposed between a conventional tire valve and the associated pressure pipe, the actuator comprising a number of improvements according to the invention;

FIGURE 3 is a sectional view taken along the line III—III of FIGURE 1;

FIGURE 5 is a view in longitudinal section of a supervisory device according to the invention;

FIGURE 6 is a view in cross-section taken along the line VI—VI of FIGURE 5;

FIGURE 7 is a partial view of a detail in section along the line VII—VII of FIGURE 5, and FIGURES 8 to 10 are three views showing, to an enlarged scale, part of FIGURE 5 in three different operating positions.

Figure 1:
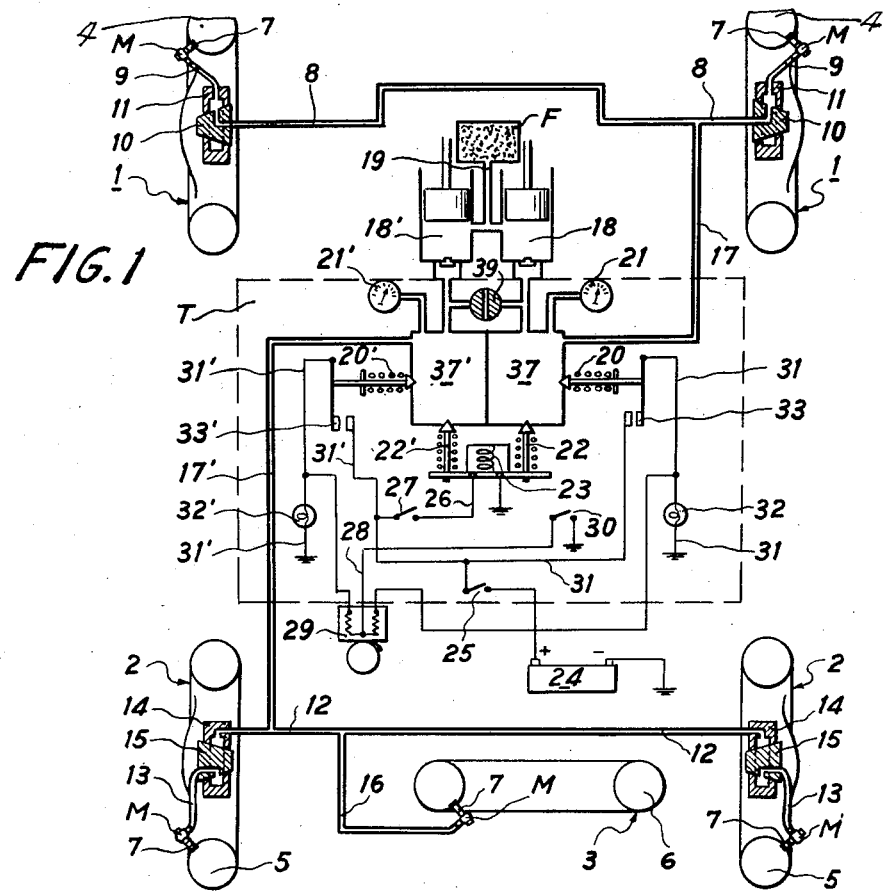
FIGURE 1 is a diagrammatic view of a complete embodiment of the system.

Referring to FIGURE 1 there can be seen front wheels 1, rear wheels 2 and a spare wheel 3, the front wheels having tires 4, the rear wheels having tires 5, and the spare wheel having a tire 6; and each tire has a conventional valve 7. A single pipe comprising a stationary part 8 and a moving part 9 rigidly secured to each wheel 1 extends to each tire valve; the moving and stationary parts are interconnected by a known kind of rotating connection comprising a stationary part 10 and a rotating part 11. Similarly, a single pipe comprising a stationary part 12 and a moving part 13 extends to the valve of each rear-wheel tire 5, the parts 12 and 13 being interconnected by a rotary connection formed by a stationary part 14 and a rotating part 15. The spare wheel tire 6 is connected to the single pipe 16. Disposed between each valve 7 and the associated pipe part 9, 13 or 16 is an actuator M which is shown in detail in FIGURE 2 and which will be described hereinafter.

In the example illustrated the two pipes 8 and the two pipes 12 associated with the tires of a single set of wheels are permanently interconnected since they branch from a common pipe 17, 17′. A compressor, of which only cylinders 18, 18' are shown and which, for instance, is mechanically coupled with the vehicle engine, and supplies compressed air continuously to the pipes 17, 17' so that, at least while the engine is running, the pipes 8, 9 and 12, 13 are always under pressure; the air taken into the cylinders 18, 18' is sucked in through a pipe 19 after passing through a filter F.

Controllable discharge valves 20 and 20', pressure gauges 21 and 21' and rapid-discharge valves 22 and 22' are connected respectively to the pipes 17 and 17' and therefore to the pipes 8, 9 and 12, 13.

The controllable discharge valves 20, 20' can be of any known kind which can be adjusted by the driver to any desired pressure level, above which the valve opens enough to maintain the pressure in the pipes at the desired value. An embodiment of such valves 20, 20' is shown in detail in FIGURES 11 and 12 which will be described further on. If any air losses due to punctures in the tires or leaks elsewhere in the system are not greater than the delivery of the cylinders 18, 18', the valves 20, 20' discharge the excess of compressed air continuously, and the pressure in the pipes 9, 13 and in the tires 4, 5 as will be seen hereinafter, is maintained automatically at exactly the pressure arbitrarily selected by the driver.

The rapid-discharge valves 22, 22' can be opened under the driver's control and connect the pipes 17, 17' to atmosphere. In the example shown in FIGURES 13 and 14, which are described further on, it is assumed that the valves 22, 22' are operated electromagnetically, remaining closed when a current flows through a coil 23, and being opened when the current ceases to flow.

The vehicle electrical installation comprises: a conventional battery 24 and general switch 25, for instance, for the vehicle engine ignition circuit; the circuit 26 of the coil 23, which circuit can be disconnected either by a special switch 27 or by the general switch 25; a circuit 28 for an audible warning device 29, such circuit being opened by a switch 30; and circuits 31, 31' for visual warnings 32, 32'. The last three circuits are operated by contacts 33, 33' which are open while the valves 20, 20' are discharging and which close when the valves 20, 20' cease to discharge so that the audible warning device 29 and the respective visual warning device 32 or 32' can be operated.

FIGURE 2 illustrates an actuator M which is disposed between a conventional valve 7 and a pressure pipe, as 9. Actuators of this kind are known and their purpose is to thrust the closure member 34 of the conventional valve 7, overcoming the inside spring 35 of the valve 7 because of the pressure in the pipe 9, and opening the valve 7 even when the last-mentioned pressure is relatively less than the pressure inside the tire; the closure member 34 is thrust by means of a member such as a differential piston or a differential diaphragm—i.e., a member which has two operative surfaces of different extension under pressure, and one inoperative surface communicating with free atmosphere.

The actuator M as shown in FIGURE 2 is of the kind which has a differential piston, and it has a number of improvements which also form part of this invention. The actuator comprises: a tubular central member 101 tapped with a screwthread 102 for connecting the valve 7; a lateral union 103 for receiving the pressure pipe 9 and having an annular head 104 having flat annular top and bottom surfaces 105, 106; and a closure member 107 comprising means for being screwed to the top of the central member 101. With this arrangement, the annular head 104, once fitted around the central member 101, is clamped between the same and the closure member 107 and, in co-operation with packing rings 108, forms a sealing-tight assembly.

The central member 101 has an internally cylindrical part 109 in which slides a differential piston 110. The same has at the top a widened part 111, and the top and bottom surfaces thereof form the major operative surface 112 and the inoperative surface 113 respectively; the lower part of the piston 110 takes the form of a tubular rod 114 which is coaxial of the closure member 34 and is adapted to thrust the same; the tubular rod 114 is guided longitudinally by a resilient collar 115 shaped to provide a sealing-tight sliding engagement. A compensating chamber 116 which communicates with free atmosphere is formed between the inoperative surface 113 and the collar 115. Through a central aperture 117 in the tubular rod 114, the pressure in the pipe 9 can act upon the major operative surface 112 of the differential piston 110 to produce a downward force strong enough to overcome all the opposing upward forces, provided that the pressure in the pipe 9 is above a critical value which can readily be calculated on the basis of the pressures and surfaces concerned and of the frictions and mechanical features of the operative members.

An advantageous improvement provided by the invention is to provide, in addition to the conventional spring 35 of the valve 7, a second spring 118 which acts directly upon the differential piston 110 with a tendency to render the same inoperative. This spring 118 is very important, for if it is made of an appropriate size and design, it can render the differential piston 110 inoperative below a critical pressure in the pipe which can be, for instance, substantially the pressure recommended by the tire maker as the minimum pressure compatible with satisfactory tire life. As a rule, the resilient reaction applied by the spring 35 to the closure member 34 is fairly small, so that in the absence of the spring 118 it is difficult, if not impossible, to arrange for the critical pressure to be the same as the recommended minimum pressure. The spring 118 therefore ensures that the critical pressure is always adequate; also, it reduces the sensitivity of the actuator to friction between the differential piston 110 and the cylindrical part 109 and the collar 115, and to centrifugal force effects, thus improving the reliability of actuator operation.

According to another improvement provided by the invention in the actuator M, the pressure pipe 9 enters the actuator laterally and terminates in an aperture 119 disposed on that side of the differential piston 10 which is associated with the minor operative surface, instead of entering the actuator and terminating on that side thereof which is associated with the major operative surface 112. From the pressure-gauge point of view, the change is unimportant in view of the presence of the passage 117, but from the mechanical point of view a considerable advantage is provided, since the actuator can be designed to project little beyond the vehicle wheels and thus not to be damaged by being knocked, for instance, against pavement curbs.

Another improvement provided by the invention is to provide the actuator M with a filter 120 for filtering the atmospheric air passing through the duct 121 to the compensating chamber 116; the filter 120 prevents dust from entering the chamber 116, since the presence of dust might make it difficult for the differential piston 110 to slide in the part 109 and collar 115.

Preferably, the controls for the controllable discharge valves 20, 20', the pressure gauges 21, 21', the visual warning devices 32, 32', the separate switch 27 for the rapid-discharge valves and the switch 30 for stopping the audible warning are combined on a panel T in front of the driver. In the case of vehicles having more than one set of wheels, the panel T comprises a valve 39 for selective interconnection of the two common pipes 17 and 17'.

Figure 4:
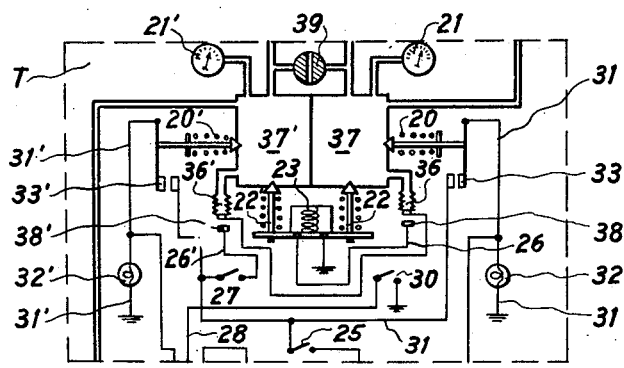
FIGURE 4 is a part of the diagrammatic view of FIGURE 1 in one alternative form of the invention.

FIGURE 4 diagrammatically illustrates a variant wherein, in addition to the element shown in FIGURE 1 in the part having the reference T, a number of supervisory devices having the general references 36, 36' are provided. The supervisory devices communicate with the pipes 17, 17' through chambers 37, 37' and comprise contacts 38, 38' disposed in series in the circuit 26, 26' of the coil 23 for operating the rapid-discharge valves 22, 22'; taken together, the members 36, 22 on the one hand and the members 36', 22' on the other hand form, as will be seen hereinafter, automatic rapid-discharge valve means which come into operation—i.e., which facilitate a rapid discharge—only when the pressure in 37, 17, 8 or in 37', 17', 12 drops below a predetermined value, but not when the pressure reaches such value by rising to it.

The two supervisory devices 36, 36', integrated to form a single device, are shown in detail in FIGURES 5 to 10, each comprising: a pressure-sensitive member 201 connected by way of the aperture 202 to the respective chambers 37 or 37'; a pin 203 having two parts 204 and 205 of different diameters; an abutment 206 which can be adjusted by screwing into a yoke 207; a rubber ring 208 of a diameter somewhere between the two diameters of the pin 203; and a contact carrier 209 having at its ends the contacts 38, 38' mentioned in connection with the description of FIGURE 4.

The member 201 is known per se and is formed by a cylindrical rubber bag 210 retained at its mouth piece between a carcass 211 and a wall 212 and surrounded laterally by a spiral spring 213 and being free at its base; the member 201 can therefore be deformed longitudinally and take up different positions in accordance with the pressure in the chamber 37 or 37'. By means of a widened part 214 at its base, the pin 203 is secured coaxially at one end of the spring 213 and can therefore move lengthwise together with the member 201 until abutting the adjustable abutment 206. The ring 208 is threaded on the pin 203 and, depending upon the positions thereof, is either free, when in registration with the reduced-diameter part 204, or engages frictionally, when in registration with the larger-diameter part 205; the inner surface of the yoke 207 helps to introduce the ring 208 onto the part 205 by acting as a fixed abutment and by limiting the movement of the ring 208 when the pin 203 advances. The contact carrier 209 is formed with four apertures; the pins 203 extend through two of such apertures, while extending through the other two are screws 215 which guide the contact carrier 209 and bear the same and which, in association with two springs 216, normally keep the circuit 26', 38', 38, 26 closed. The springs 216 are of a size and design such that, in the positions shown in FIGURES 5, 8 and 9, their spring force is less than the friction associated with the introduction of the part 205 of the pin 203 into the rubber ring 208; consequently, when the pin 203 returns with the ring 208 on its part 205, the contact carrier 209 is first thrust by the ring 208, the corresponding contact opening (FIGURE 9), whereafter the contact carrier 209 slides the ring 208 along the larger-diameter part 205 until the ring 208 disengages therefrom (FIGURE 10) and moves onto the reduced-diameter part 204 to reclose the contact.

Figure 11:
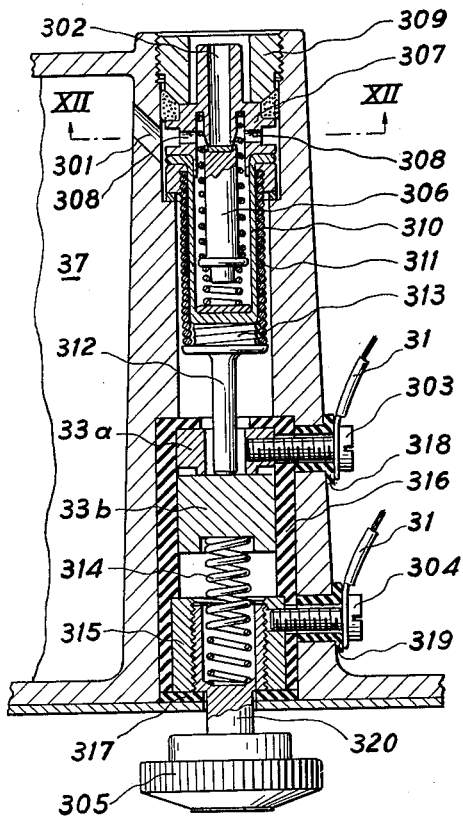
FIGURE 11 is a longitudinal sectional view of a valve which is an embodiment of the above-mentioned controllable discharge means.
Figure 12:
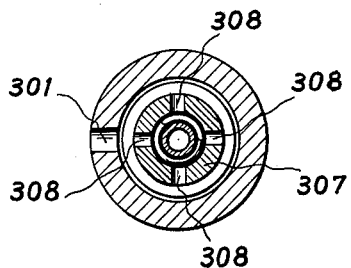
FIGURE 12 is a view in cross-section taken along the line XII—XII of FIGURE 11.

An embodiment of controllable discharge valves 20, 20', is shown in FIGURES 11 and 12, in which can be seen: a passage 301 connecting chamber 37 to the valve, a discharge passage 302, electric terminals 303 and 304 to which the conductors of circuit 31 are connected, contacts 33a and 33b which can open and close the circuit, and handwheel 305 which can be operated by the vehicle driver to adjust the pressure in the tires to the desired value. There are too: a sealing piece 306, a seat piece 307 having radial passages 308, an externally threaded retaining ring 309, a cylindrical rubber bag 310 subject to the pressure from chamber 37, a helical spring 311 laterally surrounding said bag, a pin 312 having in its base a wide portion 313 fixed to the end of helical spring 311, a stationary contact 33a, a movable contact 33b, an adjustable tension spring 314, a stationary screw nut 315, insulating pieces 316, 317, 318, 319, and a threaded rod 320 having on one end the handwheel 305 and being adapted to be screwed by the other end in stationary screw nut 315, thus permitting the tension of spring 314 to be varied and, consequently, the pressure to be adjusted.

When the pressure in chamber 37 is above the adjusted value, the cylindrical rubber bag 310 and the helical spring 311 have an increase in their length and overcome the action of adjustable tension spring 314 through pin 312 and movable contact 33b. Thereby sealing piece 306 moves away from seat piece 307 and the valve discharges air from chamber 37 through passages 301, 308 and 302, and, simultaneously, movable contact 33b moves away from stationary contact 33a thus opening circuit 31, which was closed through pieces 303, 33a, 33b, 314, 320, 315 and 304.

Figure 14:
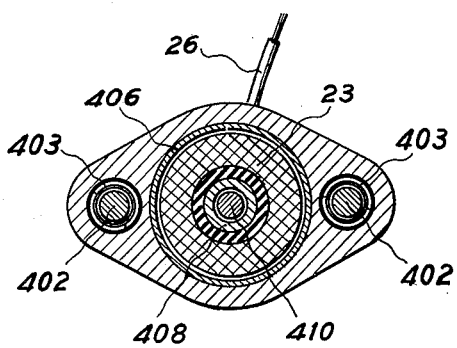
FIGURE 14 is a view in cross-section taken along the line XIV—XIV of FIGURE 13.
Figure 13:
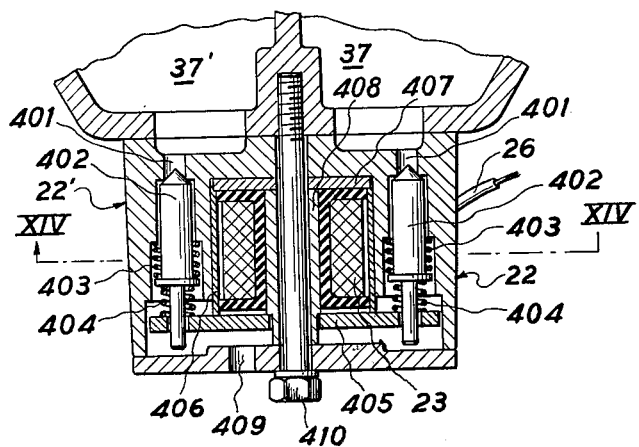
FIGURE 13 is a longitudinal sectional view of a rapid-discharge valve connected to the two sections of the system.

The two rapid-discharge valves 22, 22', are shown in detail in FIGURES 13 and 14. Each valve comprises: an orifice 401 opening in chambers 37, 37', respectively, a sealing piece 402, a spring 403 tending to open the valve, and a spring 404 tending to close it. The following members are common to both valves: coil 23 connected to circuit 26; a movable core 405 against which springs 404 are applied; pieces 406, 407 and 408 of a ferromagnetic material, which, together with the core 405, close the magnetic circuit of coil 23; an orifice 409 connecting the valves to the atmosphere; and a screw 410 fastening the assembly to chambers 37, 37'.

While coil 23 is energized, valves 22, 22' are in the position shown in FIGURE 13. The core 405 is then electromagnetically attracted and springs 404 are compressed against the action of springs 403 whereas sealing pieces 402 close orifices 401. When coil 23 ceases to be energized, springs 404 and 403 stretch and sealing pieces 402 slide, thus opening orifices 401: the air in chambers 37, 37', is then rapidly discharged to the atmosphere through orifice 409.

After this description the operation of the system shown in FIGURES 1 and 4 can be understood for the cases of most practical interest.

*Case 1*

It is assumed that the five tires are deflated, the vehicle engine is not running, the general switch 27 is open, and therefore the rapid-discharge valves 22, 22' are open.

To inflate the tires to the required normal pressures, the discharge valves 20, 20' are set to the required normal pressures, the general switch 27 is closed, and therefore the rapid-discharge valves 22, 22' are closed, the engine is started and the compressor cylinders 18, 18', therefore start to work. The pressure in the pipes 9, 13, 16 therefore starts to rise, and when the respective critical pressures have been reached, the actuators M open the valves 7 automatically and so inflation of the tires starts. When the required normal pressures have been reached, the discharge valves 20, 20' open automatically and the excess air escapes to atmosphere, there being no possibility of the desired normal pressures being exceeded.

If the vehicle engine is stopped by the general switch 27 being opened, the cylinders 18, 18' cease operation, and the rapid-discharge valves 22, 22' open to connect the pipes 17, 17' to atmosphere. The pressure in the pipes 9, 13, 16 therefore drops abruptly below the critical pressure so that the actuators M become inoperative and the valves 7 close rapidly and automatically without any appreciable reduction in the normal pressure of the tires.

*Case 2*

This is similar case to case 1 except that only a single tire, and not all five tires, is deflated. It will also be assumed that the interconnection valve 39 is open.

If the procedure outlined in connection with case 1 is followed, events will proceed similarily except that, once the critical pressures have been reached, the four normal tires will assist the deflated tire because of the compensation between the various positions, with a tendency towards a single intermediate pressure.

Case 3

It will be assumed that, when all the tires are at their normal pressure, some cause, such as external heating, tends to increase the pressure inside the tires.

If the vehicle is stationary, then the general switch 27 is open and the rapid-discharge valves 22, 22' are therefore open, and there is actually an excess pressure in the tires, but such excess pressure disappears shortly after the engine is started. The compressor cylinders 18, 18' start to operate when the engine is started, and the pressures in the pipes 9, 13, 16 soon rise to the critical values, with the result that the actuators M open the respective valves 7 and the excess pressure of the tires is reduced, the tires discharging until their pressure balances the pressure in the pipes 9, 13, 16; finally, because of the combined effect of the compressor and of the discharge valves 20, 20', the required normal pressures are reached.

If the vehicle is running (valves 22, 22' closed), no excess pressure can become operative, for immediately the engine is started, the actuators M keep the tire valves 7 open and so the pressure therein cannot rise above the normal value.

Case 4

It will be assumed that, because of a change in the state of the running surface or of vehicle loading, a change up or down is required in normal tire pressure. All that is required for this is to set the discharge valves 20 and 20' to the pressures required in the respective tires 4 and 5. If the vehicle is in operation and if the new pressures are below the previous pressures, the amount of air required to compensate for the excess pressure is removed through the valves 20, 20'. If the new pressures are greater than the previous pressures, the valves 20, 20' remain closed long enough for the air supplied by the compressor to compensate for the shortfall of pressure.

Assuming that the vehicle is stationary and that the valves 22, 22' are open, then, when the engine is started the installation will operate as has been described with references to cases 1 and 4, depending upon whether the new pressures are above or below the former pressures.

Case 5

The vehicle is running, the valve 39 is closed and all the tires are at normal pressure, when a tire 4 is pierced and starts to lose air.

If the loss of air is not in excess of the air supplied by the compressor, the two tires 4 remain at their normal equalised pressures, without any disturbance to the running or steering of the vehicle. The driver will notice the damage when the vehicle has been stopped for some time at its destination.

If the loss is in excess of the air supplied by the compressor, the valve 20 closes, the contact 33 therefore closes and the audible and visual warning systems 29, 32 operate to warn the driver; he can gauge the amount of damage by observing on the pressure gauge 21 the rate of discharge of the tire. Until the critical pressure of the actuator M is reached, corresponding to the damaged tire or the pressure to which the device 36 controlling the rapid-discharge valve 22 is adjusted, the undamaged tire 4 transfers air to the damaged tire 4 and the pressure between the two tires is equalised. The vehicle can therefore run for some time without its steering being disturbed; also, the rate of discharge of the damaged tire is half what it would be without the assistance of the other tire. In some cases assistance can be provided by more than one tire as, for instance, when the damage occurs in a tire 5 or when the valve 39 is open.

It is almost essential to use the supervisory devices 36, 36' to control the rapid-discharge valves 22, 22' when the actuators M have no spring 118 according to the invention for, as already stated, the critical pressure is then usually much less than the minimum pressure recommended by the tire manufacturer; however, the discharge pressure can be selected as required by adjusting the devices 36, 36' appropriately. When the actuators M have a spring 118, the devices 36, 36' can be omitted, although it may be useful to use them with a view to improved safety and accuracy in the operation of the system.

What we claim is:

1. A system for automatic control, regulation and supervision of the pressure within pneumatic tires on vehicle wheels, the tires having conventional valves mounted in inflation stems carried by the tires in a conventional location, the system comprising in combination;

(a) a single pipe for each tire in which the pressure is to be controlled, regulated and supervised, the pipe extending adjacent the tire valve, and being capable of containing fluid under pressure, (b) a compressed air supply means communicating with the single pipes and providing compressed air therein permanently, at least while the vehicle is in operation, (c) an actuator for each tire valve on each tire, (d) means for mounting the actuator on the conventional inflation stem to be disposed between the conventional tire valve and the associated single pipe, (e) a differential member within the actuator adapted to be operated by pressure in the single pipe to open the conventional valve and to provide communication between the pipe and the tire, (f) a spring within each actuator acting directly upon the differential member therein so as to render the same inoperative when the pressure in the associated single pipe is below a desired preset limit, (g) controllable discharge means connected to the single pipe and adapted to provide a continuous discharge of the excess compressed air supplied by the compressed air supply when a critical pressure selected by a vehicle operator is reached, (h) indicating means operated by the controllable discharge means, (i) electrically operated valve means for rapid discharge of the single pipes, (j) supervisory means connected to the single pipes and adapted to electrically operate the rapid discharge valve means only when the pressure in the single pipes drops below a predetermined value and not when the pressure rises to such value, (k) electrical connecting means adapted to operate the rapid discharge valve means on switching off the vehicle ignition circuit.

2. A system for automatic control, regulation and supervision of the pressure in pneumatic tires on vehicle wheels, the tires including a conventional inflation stem carrying a conventional valve located in the conventional place adjacent the inner periphery of the tire, the system comprising in combination;

(a) a single pipe for each tire in which the pressure is controlled and regulated, the pipe extending up to and adjacent the conventional tire valve, the pipe being capable of being maintained under pressure;

(b) compressed air supply means communicating with the single pipes and providing compressed air therein permanently, at least while the vehicle is in operation;

(c) an actuator for the tire inflation valve for each of the tires;

(d) means for mounting the actuator directly on the inflation stem and connecting the actuator to the single pipe in pressure tight relationship;

(e) a differential member included in the actuator and adapted to be operated by pressure in the single pipe to act upon and open the conventional valve within the inflation stem and to thereby provide communication between the pipe and the tire;

(f) controllable adjustable pressure-responsive discharge means connected to the pipe and adapted to provide a continuous discharge of excess compressed air supplied by said compressed air supply means when a critical adjustable pressure selectable by a vehicle operator is reached, and (g) an automatically operated rapid discharge valve means connected to said single pipes, and an actuator for the rapid discharge valve means operated by the pressure in the single pipes, the actuator being adapted to operate the rapid discharge valve means only when the pressure in the single pipes drops below a desired predetermined value.

3. A system as defined in claim 2 in which the actuator for the rapid discharge valve means comprises, a pressure-sensitive member connected to the single pipe and adapted to move to different positions in accordance with the pressure in the single pipe, a pin connected to the pressure-sensitive member and extending in the direction of movement thereof, and a thrust element resiliently engageable by the pin so as to be slidable therealong during pin advance and to be retained on a part of the pin during return movement thereof.

4. A system for automatic control, regulation and supervision of the pressure in pneumatic tires on vehicle wheels, the tires including a conventional inflation stem carrying a conventional valve located in the conventional place adjacent the inner periphery of the tire, the system comprising in combination;

(a) a single pipe for each tire in which the pressure is controlled and regulated, the pipe extending up to and adjacent the conventional tire valve, the pipe being capable of being maintained under pressure;

(b) compressed air supply means communicating with the single pipes and providing compressed air therein permanently, at least while the vehicle is in operation;

(c) an actuator for the tire inflation valve for each of the tires;

(d) means for mounting the actuator directly on the inflation stem and connecting the actuator to the single pipe in pressure tight relationship;

(e) a differential member included in the actuator and adapted to be operated by pressure in the single pipe to act upon and open the conventional valve within the inflation stem and to thereby provide communication between the pipe and the tire;

(f) means mounting the differential member to be operated by the pressure in the single pipe for slidable movement;

(g) means for receiving the single pipe in the actuator through a lateral opening so that the single pipe is in fluid communication with the minor operative surface of the differential member, and (h) controllable adjustable pressure-responsive discharge means connected to the pipe and adapted to provide a continuous discharge of excess compressed air supplied by said compressed air supply means when a critical adjustable pressure selectable by a vehicle operator is reached.

5. A system as defined in claim 4 wherein the actuator further comprises a filter disposed in a path of fluid communication between the atmosphere and a chamber within the actuator below the inoperative surface of the differential member.

6. A supervisory device for use in an installation for automatic control, regulation and supervision of the pressure in pneumatic tires on vehicle wheels, the tires including a conventional inflation stem carrying a conventional valve located in the conventional place adjacent the inner periphery of the tire, the system comprising in combination; a single pipe for each tire in which the pressure is controlled and regulated, the pipe extending up to and adjacent the conventional tire valve, the pipe being capable of being maintained under pressure; compressed air supply means communicating with the single pipes and providing compressed air therein permanently, at least while the vehicle is in operation; an actuator for the tire inflation valve for each of the tires; means for mounting the actuator directly on the inflation stem and connecting the actuator to the single pipe in pressure tight relationship; a differential member included in the actuator and adapted to be operated by pressure in the single pipe to act upon and open the conventional valve within the inflation stem and to thereby provide communication between the pipe and the tire, and controllable adjustable pressure-responsive discharge means connected to the pipe and adapted to provide a continuous discharge of excess compressed air supplied by said compressed air supply means when a critical adjustable pressure selectable by a vehicle operator is reached, the supervisory device electrically controlling the discharge pressure of the corresponding single pipes and the supervisory device comprising in combination: a pressure sensitive member connected to the corresponding single pipe and adapted to move and take up different positions in accordance with the pressure in the single pipe; a pin connected to said member and extending in the direction of movement thereof; and a thrust element resiliently engageable to said pin so as to be slidable therealong during pin advance and to be retained on a part of the pin during the return movement thereof, then acting operatively.

7. A supervisory device as set forth in claim 6 comprising in combination: a pressure-sensitive member connected to the corresponding single pipe and adapted to move and to take up different positions in accordance with the pressure in the single pipe; a pin connected to said member and extending in the direction of movement thereon and having two parts of different diameters; a first adjustable abutment for limiting the movement of said member as far as a position corresponding to the required discharge pressure; a thrust element engaged on said pin and adapted to be a friction fit in its larger-diameter part but being free in its minor-diameter part; a second and stationary abutment for limiting the movement of the thrust element when the pin advances and carries the thrust element along with it; and a switch member so disposed relatively to the thrust element that, when the pin returns with the thrust element on its greater-diameter part, such switch member is first thrust by said thrust element to open an electric contact, whereafter said thrust element slides along said pin until passing onto the minor-diameter part.

References Cited in the file of this patent

UNITED STATES PATENTS

| | | |
|---|---|---|
| 1,801,716 | Bowers | Apr. 21, 1931 |
| 2,013,846 | Borel | Sept. 10, 1935 |
| 2,685,906 | Williams | Aug. 10, 1954 |
| 2,715,430 | Lindeman | Aug. 16, 1955 |
| 2,976,906 | Kamm et al. | Mar. 28, 1961 |